Figure 1:
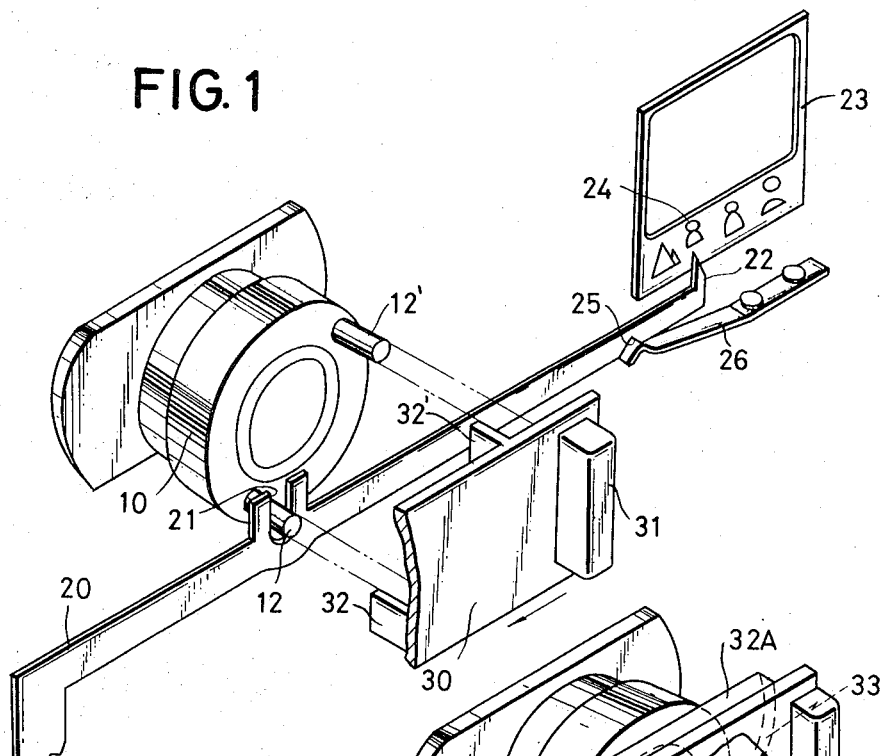

United States Patent [19]
Tanaka

[11] 3,798,670
[45] Mar. 19, 1974

[54] CAMERA FOCUSING MECHANISM
[75] Inventor: Harumi Tanaka, Kobe City, Japan
[73] Assignee: Minolta Camera Kabushiki Kaisha, Osaka, Japan
[22] Filed: Sept. 21, 1972
[21] Appl. No.: 290,924

[30] Foreign Application Priority Data
Oct. 20, 1971 Japan.......................... 46-9684[U]
June 3, 1972 Japan........................ 47-65824[U]

[52] U.S. Cl....................... 95/44 R, 95/45, 95/53 R
[51] Int. Cl.............................................. G03b 3/00
[58] Field of Search............. 95/39, 44 R, 45, 53 R, 95/11 V

[56] References Cited
UNITED STATES PATENTS
3,585,916  6/1971  Lange..................................... 95/39

*Primary Examiner*—Samuel S. Matthews
*Assistant Examiner*—E. M. Bero
*Attorney, Agent, or Firm*—Wolder & Gross

[57] ABSTRACT

A camera includes an objective lens which is focussable by a rotatable focus ring and a lens cover which is slideably or swingably supported by the camera for movement between open and closed positions. A lost motion connection couples the cover to the focus ring to urge the focus ring to a predetermine intermediate position with the closing of the cover and predetermined the coupling ring upon the opening of the cover to permit the manual rotation of the focus ring.

11 Claims, 8 Drawing Figures

CAMERA FOCUSING MECHANISM

The present invention relates to a camera having a front lens mount adapted to be normally set at a predetermined focus position, and more particularly to a mechanism provided in such camera for automatically returning said lens mount, when it is incidently at any other focus position, to said predetermined focus position in mechanical relation with closing a protector lid for covering the lens.

There are cameras having a front lens mount or a focus control ring adapted to be normally set at an intermediate focus position. This normal set position is generally ensured by click engagement means. In these cameras it is of course made possible to angularly move the lens mount or the focus control ring to be hellicoidally pushed out or retracted in for varying the focus position. When the last photographic operation is a short focus shot or a long focus shot and if the camera was left as it was without angularly moving the lens mount back to its normally set position for the usual intermediate focus shot, the photographer would often forget and proceed with the next photographing of an ordinary distance subject with his camera actually not in the usual focus status, which naturally causes out-of-focus failure.

There have been hithertofore proposed some solutions for preventing such failure, among which it would be popular to provide an elastically urging means applied to the focus control ring or the front lens mount so as to be returned to the normally set usual focus position in response to the film winding or the shutter releasing operation. Although the detailed description for attaining said purpose is various, this is inadvantageous as readily appreciated in that the mechanism is complex and that the successive operations for the unusual focus shot would be troublesome since the lens mount is always returned to the usual focus position after every one shot. Furthermore, when focus positions for the short range and long shots are provided in addition to the usual focus position, it is difficult to design such mechanism to be automatically returned to said usual focus position from either of said unusual focus positions. It has been also proposed to provide separate two shutter release buttons for the usual focus shot and e.g. for the short approach shot, but this is constructionally complex. Further there is a fear of confusion between the two buttons, above all in case where the shooting must be made momentarily. It has been also proposed to use an attachment lens for the unusual focus shot, but this solution is quite unsatisfactory as well known in that the mounting-dismounting operations are troublesome and the correct or sharp focusing is hardly attained.

One of the objects of the invention is thus to provide a mechanism for attaining the purpose with avoiding or overcoming the faults referred to above.

Another object of the invention is to provide such mechanism which is constructionally simple and can be handled easily for attaining the purpose substantially without fail.

Still another object is to provide such mechanism to be applied to the conventional cameras without much design change.

These objects can be attained according to the invention by mechanically connecting the front lens mount or the focus control ring with the protector lid for covering the lens.

Figure 3:
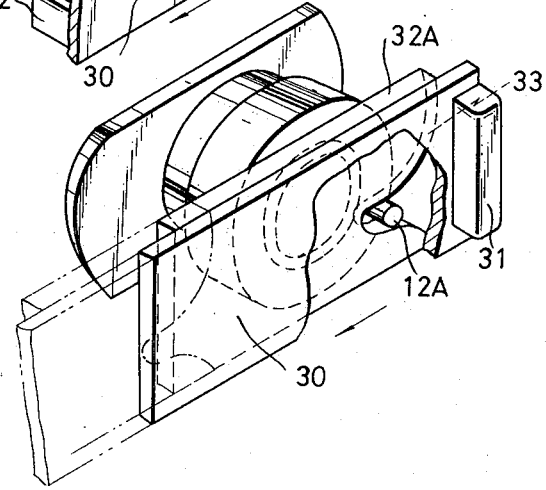
Figure 2:
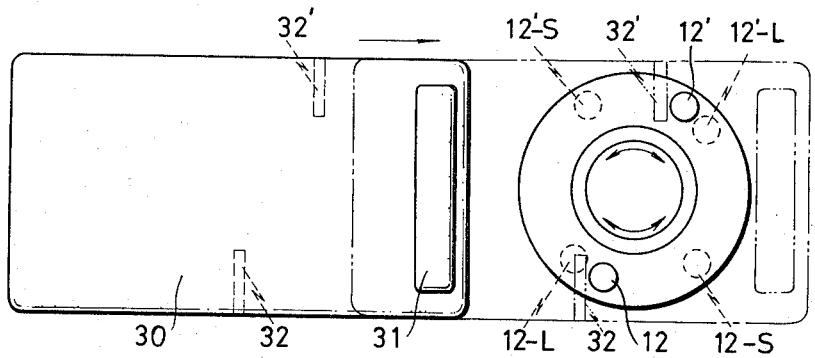
Figure 4:
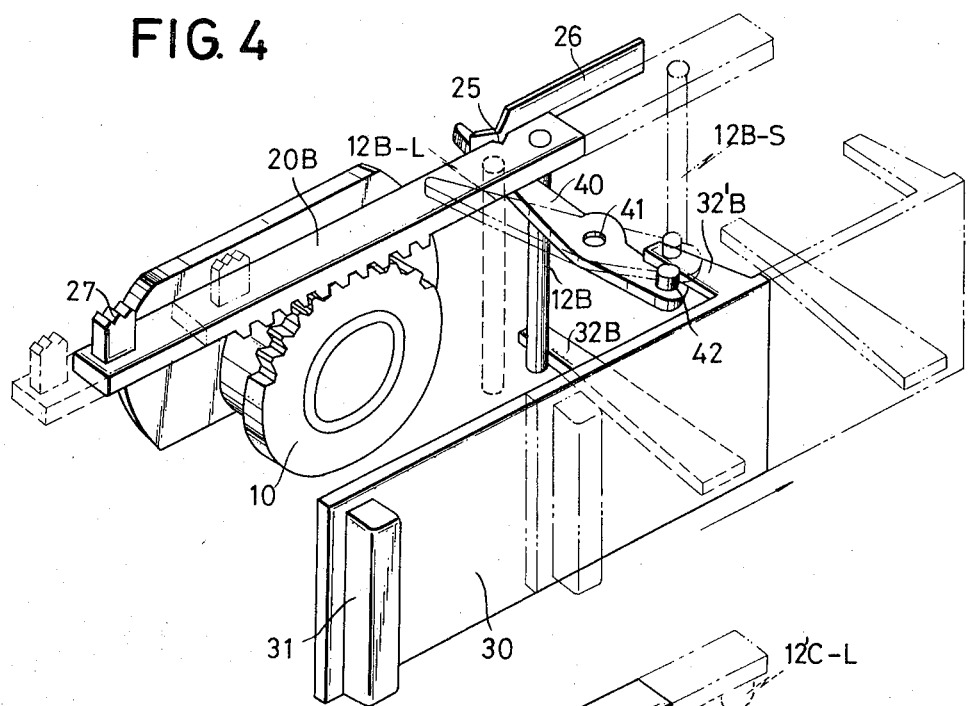
Figure 5:
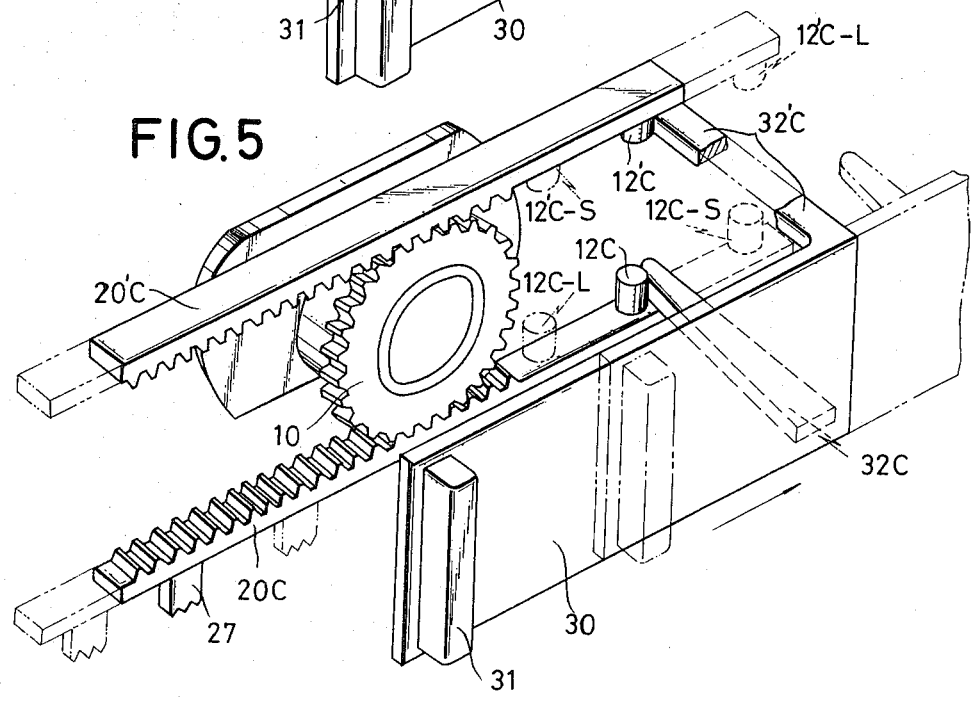
Figure 6:
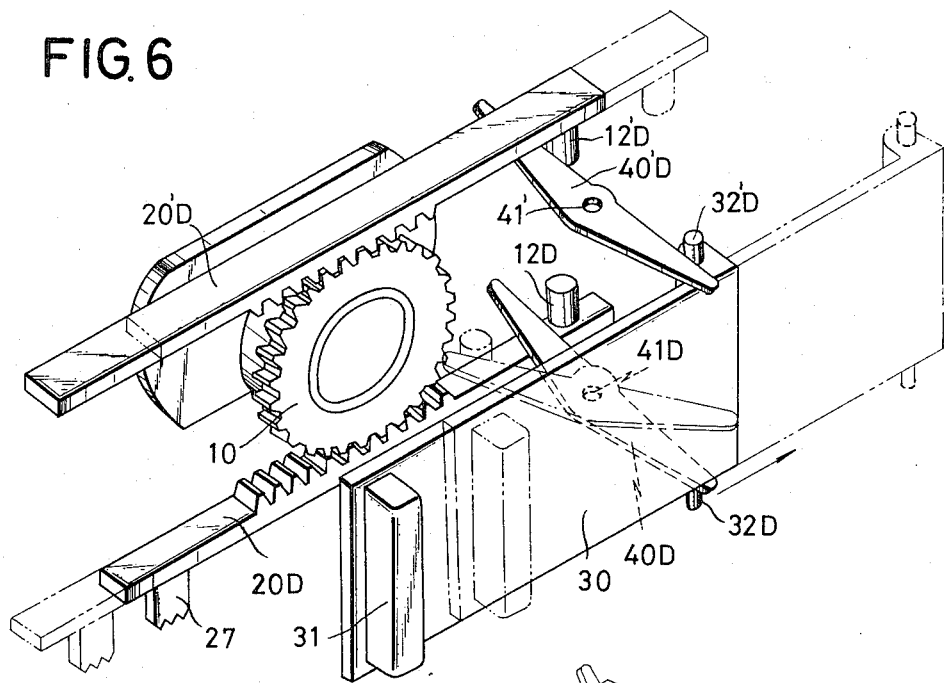
Figure 7:
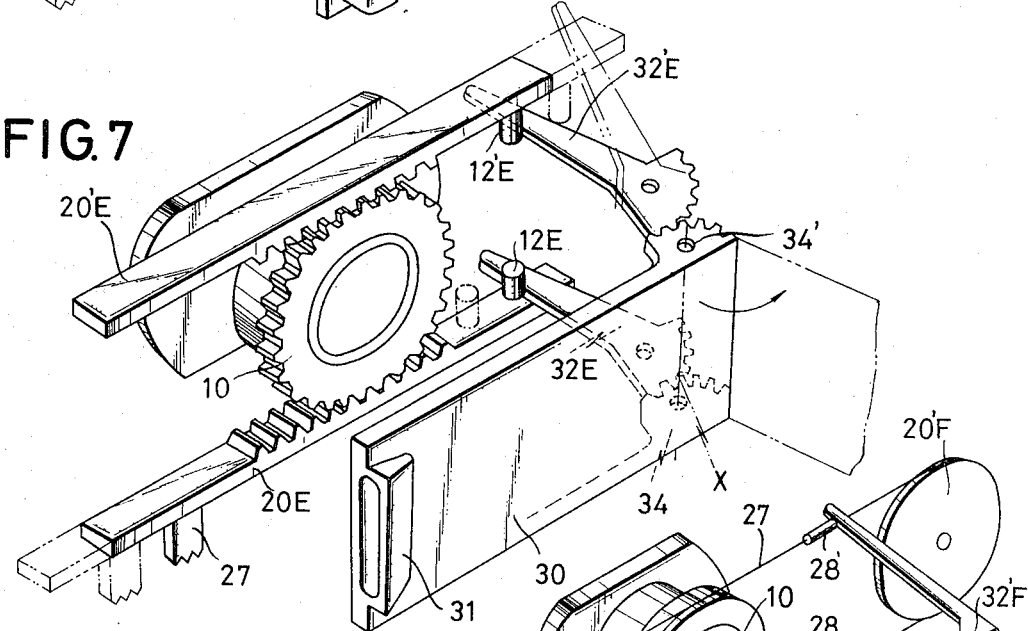
Figure 8:
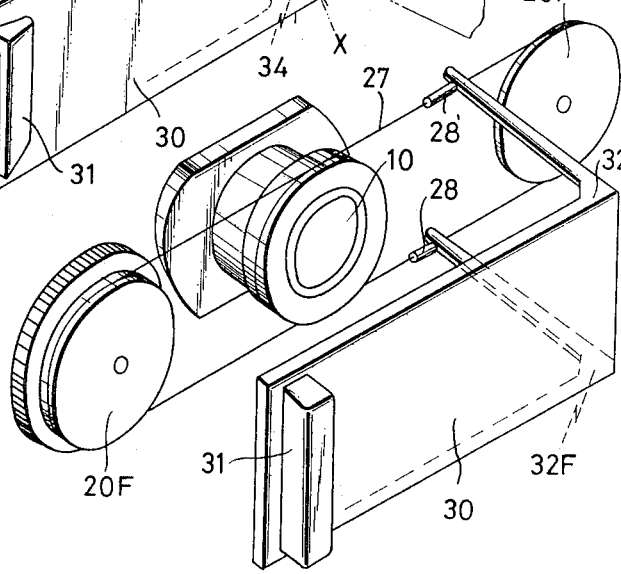

Other objects and advantages of the present invention would be readily appreciated from the explanation to be made hereinafter of several preferred embodiments with respect to a 16 mm camera in reference to the accompanying drawings in which;

FIG. 1 is a schematic perspective view of one embodiment of various mechanisms according to the invention, in which the lens mount takes the usual or predetermined intermediate focus position and the lens protector lid of the sliding door type is in the closed position for covering the lens, FIG. 2 is a schematic front view of the above, in which the lens protector lid is illustrated in the open position by solid lines and in the closed position by phantom lines; and the angularly movable front lens mount is illustrated in the usual focus position by solid lines and in the two unusual focus positions by phantom lines, FIG. 3 is a schematic perspective view of the second embodiment, in which also the lens protector lid is illustrated by solid lines for the closed position and by phantom lines for the closed position, FIG. 4 is a similar view of the third embodiment, in which the lens protector lid is mechanically related directly not with the lens mount nor with the focus control ring as in the preceeding embodiments but with a toothed rack meshingly engaging the toothed focus control ring, FIG. 5 is a similar view of the fourth embodiment, FIG. 6 is a similar view of the fifth embodiment, FIG. 7 is a similar view of the sixth embodiment, in which the lens protector lid is not of the sliding door type as in the preceeding embodiments but of the hinged door type, and FIG. 8 is a similar view of the seventh embodiment, in which the lens protector lid is of the sliding door type again.

In FIG. 1, a front lens mount or a focus control ring is represented generally by 10, which is adapted to be angularly moved so as to be hellicoidally pushed out or retracted in for the focus control. Said mount or ring 10 has two pins 12 and 12' located at opposite positions on the front surface thereof which project outwards. There is provided in front of said mount 10 a transversely extending bar 20 which has a notch 21 in which one of said pins, say 12, is engaged so that when said bar 20 is moved along its length in either direction the lens mount 10 may be correspondingly angularly moved. There is provided a finder frame 23 on which a plurality of symbols or marks each representing a suitable focus position for the corresponding distance from the subject to be photographed. A symbol 24 is now illustratedly indicated by a free end of said bar 20 as indicator 22 so as to show that the mount or ring 10 is set at the usual focus position. In order to normally keep such position, the bar 20 preferably has a notch 25 in which the free end of a leaf spring 26 is elastically fitted for click engagement. In front of said lens mount 10 is provided a lens protector lid 30 for transverse sliding movement between the closed position for covering the lens and the open position for exposing the lens ready for the shooting. For facilitating manual actuation of said lid 30, it is preferably provided with a rib 31 on the outer surface. The lid 30 further has two brackets 32 and 32' mounted on the inner side thereof respectively projecting toward the lens mount 10 in such a way as to abut respectively on said pins 12 and 12' of the mount 10 being at the usual focus position when the lid 30 is at its closed position but has no affect on said pins 12, 12' and consequently on the mount 10 even if the lid 30 is moved leftwards, namely in the direction to the open position. This relation of the bracket 32 to the pin 12 and of the bracket 32' to the pin 12' is shown by phantom lines in FIG. 1 in which the lens lid 30 is illustrated remotely positioned from the lens mount 10 or in the exploded stutus for clarification of the drawing, but more clearly in FIG. 2 in which the lens protector lid 30 is illustrated at the open position by solid lines different from FIG. 1. In this position of the lid 30, both the lower left bracket 32 and the upper right bracket 32' are completely free from the pins 12 and 12' so that the lens mount 10 may be angularly moved at will for any desired focus shooting. When the lid 30 is moved in the right direction in FIG. 2 to occupy the closed position represented by phantom lines, however, the brackets 32 and 32' contact the pins 12 and 12' being now at the normal positions illustrated by solid lines for the usual focus shot, e.g., for the distance of 3.5 m from the subject.

When the front lens mount 10 is angularly moved in the counterclockwise direction in FIG. 2 to occupy the close shot position, e.g., for the distance of 1 m from the subject, the pins 12 and 12' assume angular positions -S as illustrated by phantom lines. If the lid 30 is moved to be closed to the right in the figure or toward said pins 12, 12' which are in said positions, the upper right bracket 32' of the lid would early contact with the upper left pin 12'. When the lid 30 is moved further to the right to take its final closed position, it would urge the pin 12' so as to angularly move the mount 10 in the clockwise direction in the drawing.

If the front lens mount 10 has been angularly moved in the clockwise direction from the usual focus position in solid lines to the position for the long shot conventionally represented by a mark, ∞, so that the pins 12 and 12' occupy the angular positions -L contrary to the above, so the movement for closing said lid 30 would cause early contact of the lower bracket 32 with the lower pin 12. Thus further movement of the lid 30 urges the pin 12 and consequently angularly move the mount 10 in the counterclockwise direction to occupy the usual focus position.

It would be appreciated from the above that when the lens mount or the focus control ring 10 has been incidently moved to any of the unusual focus positions, closing the lens protector lid 30 to be made without fail after shooting would automatically return the lens mount or the focus control ring 10 to its normal or predetermined reset position for the usual focus shot.

In FIG. 3 there is illustrated a second embodiment, in which the mount 10 has only one pin 12A. The lens protector lid 30 is similarly of the sliding door type so that it may cover the lens at its rightmost position and be moved in the left direction in the figure so as to expose the lens for shooting at the open position. Said lid 30 is illustrated at the closed position shown by solid lines similar to FIG. 1 and at the open position by phantom lines. The lid 30 has a notched plate member 32A in lieu of the flanges 32, 32' in the embodiment of FIGS. 1, 2 for angularly moving the lens mount 10 by engaging the pin. Said plate member 32A has a sideways lying substantially V-shaped notch 33 formed at the right side thereof and is affixed on the inner surface of the lid 30. This rightwardly divergent notch 33 is adapted to engage with said pin 12A of the lens mount or focus control ring 10 being at a predetermined intermediate focus position, at the root of the V-shaped slot 33, when the lid 30 and consequently the plate member 32A is at the closed position. Either of the upper and lower inclined portions of the notch 33 is preferably not linear but convexed.

When the lid 30 is moved leftwards to occupy the open position illustrated by phantom lines, this would not effect the pin 12A. The mount 10, thus, may be freely angularly moved for focus controlling, whereby the pin 12A is angularly moved in either of the clockwise and counterclockwise directions. Rightward movement of the lid 30 to be closed would urge the pin 12A by abutment with the upper or lower slope of the notch 33 to slide thereon and reach at the root of said V-shaped slot 33. Thus when the lid 30 has been completely closed, then the mount 10 is returned to the original angular position for the intermediate focus shot.

It is preferable to provide also in this case a click engagement for ensuring the normal intermediate position.

In FIG. 4, the focus control ring 10 is partly toothed so as to meshingly engage with a toothed rack 20B which extends transversely and preferably has a tab 27 for facilitating manual actuation of said rack 20B. When the rack 20B illustrated at the intermediate position by solid lines is moved leftwards, the focus control ring 10 would be angularly moved in the counterclockwise direction in the drawing for the long shot. If the rack 20B is moved in the opposite direction, the focus control ring 10 is angularly moved in the clockwise direction for the short range shot. The rack 20B is notched for click engagement with the leaf spring 26 similarly to FIG. 1 for ensuring the normal intermediate position. In this embodiment, a pin 12B depends vertically from said rack 20B. The pin 12B would take a position 12B-S for the short range shot or a position 12B-L for the long shot respectively illustrated by phantom lines, depending on the movement of the rack 20B referred to above. The lens protector lid 30 is illustrated in the closed position by solid lines and adapted to be moved rightwards to occupy the open position shown by phantom lines. The lid 30 has a lower bracket 32B and an upper bracket 32'B fixed on the inner surface of said lid so as to project toward the focus control ring 10. The lower bracket 32B is so arranged that the tip end thereof may abut on said pin 12B being at the normal position when the lid 30 is at the closed position but is disengaged from said pin 12B and moved leftwards to be closed. Between the rack 20B and the lid 30 there is extendingly provided a lever 40 for mechanically connecting said two members. Said lever 40 pivoted are 41 at the center thereof for angular movement has one end abutting on the rack pin 12B and the other end on which is located a pin 42 to abut on the upper bracket 32'B, when the pin 12B is at the normal position and the lid 30 is at the closed position, in such a way that rightward movement of the lid 30 to occupy the closed position would affect nothing on the lever 40 and consequently on the pin 12B.

When the lid 30 is opened for shooting, their lower and upper brackets 32B, 32'B would occupy the respective positions shown by phantom lines in FIG. 4 without affecting anything on the pin 12B as referred to above. Now when the rack 20B has been moved rightwards for the short range shot so that the pin 12B may take the position 12B-S, leftward movement of the lid 30 to be closed for housing the camera would realize early contact of the lower bracket 32B with the bracket pin 12B now at the position -S. Further movement of the lid 30 urges the pin 12B to finally occupy the original position illustrated by solid lines. When the rack 20B has been moved leftwards for the long shot so that the pin 12B may take the position 12B-L shown by phantom lines, the pivoted lever 40 would have been angularly moved in the counterclockwise direction to occupy the position shown by phantom lines. Thus closing the lid 30 would cause early contact of the upper bracket 32'B with the pin 42 located on the adjacent end of the lever 40. Further movement of the lid 30 to be completely closed thus angularly moves the lever 40 in the clockwise direction to occupy the initial normal position shown by solid lines, which in turn returns the pin 12B from the position -L to its initial position shown by solid lines.

In FIG. 5, there are provided two toothed racks 20C and 20'C different from the preceding embodiment in which only one rack is used. The manually actuated rack 20C corresponding to the rack 20B in FIG. 4 is arranged below the focus control ring 10. This lower rack 20C thus preferably has the tab 27 for facilitating the manual actuation thereof and an upwardly projecting pin 12C in lieu of the pin 12B projecting downwards in the embodiment of FIG. 4. The upper rack 20'C is arranged above the focus control ring 10 substantially in parallel to the lower rack 20C so that the latter is manually actuated to move along the length thereof in either direction then the focus control ring 10 may be correspondingly angularly moved which in turn causes the movement of the upper rack 20'C in the direction reverse to the lower rack 20C. The upper rack 20'C also has a depending pin 12'C. The lens protector lid 30 has two brackets 32C and 32'C so that when the focus control ring 10 is at the intermediate focus position the racks 20C, 20'C and consequently their pins 12C, 12'C occupy their normal positions illustrated by solid lines in FIG. 5 and when the lid 30 is at the closed position shown by solid lines therein, the brackets 32C and 32'C respectively abut the respective rack pins 12C and 12'C in such a way that the movement of said lid 30 to be opened would affect nothing on said pins 12C and 12'C.

The operation of the device of FIG. 5 is principally similar to the preceding embodiments. It shall be added only that when the rack 20C has been moved rightwards in FIG. 5 so that the pin 12C may take the position -S and the focus control ring 10 may have been angularly moved in the counterclockwise direction for the short range shot, then the upper rack 20'C would have been moved leftwards and thus the pin 12'C would occupy the position 12'-S as shown by phantom lines in the figure.

In FIG. 6 there is shown still another embodiment which is similar to that shown in FIG. 5. A toothed rack 20D which is manually actuated has a pin 12D positioned to project upwards and a toothed rack 20'D has a pin 12'D positioned to project downwards. Said racks are arranged in parallel with each other so as to meshingly engage with the toothed focus control ring 10 arranged therebetween. The lens protector lid 30, in this embodiment, has an upper pin 32'D and a lower pin 32D respectively projecting upwards and downwards, in lieu of the brackets projecting towards the focus control ring in the preceding embodiments. Between the rack pin 12D and the lid pin 32D as well as between the rack pin 12'D and the lid pin 32'D, there are provided two arms 40D and 40'D as intermediate means for mechanically relating the lid movement with the rack movement just similar to the arm 40 in FIG. 4. Said levers 40D and 40'D are separately pivoted at 41D, 41'D at the respective centers thereof for independent angular movement. The forward ends of levers 40D & 40'D lie in the path of pins 32D and 32'D respectively. For the purpose of clarification of the drawing the racks 20D, 20'D and their pins 12D, 12'D are illustrated at only one of the displaced positions by phantom lines. It would be noted that two or more unusual focus positions other than the intermediate position may be set just as in the other embodiments.

There is no necessity of further additional explanation on the arrangement and the operation of the embodiment in FIG. 6.

In FIG. 7 there is provided two racks 20E and 20'E just as those shown in FIGS. 5 and 6. Said racks similarly have respective pins 12E and 12'E. The lens protector lid 30, however, is not of the sliding door type but of the hinged door type. At the lower and upper portions of the lid 30 there are fixed two members 34 and 34' so as to allow angular movement of the lid about an axis X extending through centers of said two members 34, 34'. Each of these two members 34 and 34' is preferably a half circular disk of whose circumferential surface is toothed.

There are provided two pivoted levers 32E and 32'E each having a toothed end portion for meshingly engaging with each of said toothed disk members 34 and 34' so that the angular movement of the lid 30 and consequently of the disk members 34, 34' in the counterclockwise direction for opening the lid 30 would cause the angular movement of said levers 32E and 32'E. The tip end of each of said levers 32E and 32'E abuts respectively on the rack pins 12E and 12'E when the focus control ring 10 is at the closed position, but is adapted to be disengaged from said pins 12E and 12'E without affecting anything thereon when said lid 30 is angularly moved to be opened. When the focus control ring 10 has been moved to occupy any of the displaced focus positions then closing angular movement of the lid 30 would cause early contact of the lever 32E with the pin 12E or of the lever 32'E with the pin 12'E so as to return the focus control ring 10 to its initial position for the intermediate focus shot.

In FIG. 8 there is illustrated a final example in which the lens protector lid 30 is again of the sliding door type and has two brackets 32F and 32'F like as in FIGS. 4 and 5. The angular movement of the focus control ring 10 is adapted to be made by an endless cable or belt 27 extending around two wheels or drums 20F and 20'F and wound around the focus control ring 10 arranged therebetween. Either of said wheels, say 20F is preferably circumferentially notched for facilitating manual actuation thereof. Said cable or belt 27 has two follower pieces 28 and 28' respectively fixed thereon at the lower and upper runs thereof so that when the lid 30 is at the closed position and the focus control ring 10 is at the intermediate focus position, then the top ends of the lid brackets 32F and 32'F respectively abut on said pieces 28 and 28', but may be disengaged therefrom without affecting anything thereon when the lid 30 is moved rightwards to be opened. When the wheel 20F has been moved in either direction for correspondingly angularly moving the focus control ring 10 to occupy any of the displaced focus positions, closing the lid 30 would cause early contact of either of the brackets 32F and 32'F with either of the pieces 28 and 28' to return the focus control ring 10 to its initial position.

Other various modifications and changes can be readily made by those skilled in the art from the disclosure given herein without departing the spirit of the invention.

What is claimed is:

1. In a camera including an objective lens barrel axially movable between advanced, retracted and reset positions, a focussing mechanism comprising a focussing member rotatable with the axial movement of said barrel, said focusing member being removable between advanced and retracted positions and through a predetermined reset position between said advanced and retracted positions with the axial movement of said barrel to its corresponding positions, a lens protector member movable between an open position and a closed position, and reset means responsive to the movement of said lens protector member towards its closed position for urging said focussing member to said reset position, said reset means being unresponsive to the movement of said lens protector member to its open position.

2. The mechanism as claimed in claim 1 in which said reset means comprises at least one abutment member provided on one of said lens protector member and said focussing member, and at least one cooperative member provided on the other of said members said abutment and cooperative members being in engagement when said lens protector member is at said closed position and said focussing member is at its resets focus position.

3. The mechanism as claimed in claim 2, in which said focussing member comprises a cylindrical member mounted concentric with said lens barrel, said cylindrical member having two pins defining said abutment members and being located at diametrically opposite positions on a front surface thereof to axially project outwards from said camera wherein; said lens protector member is a lid provided in front of said cylindrical member with respect to said camera, said lens protector member being transversely movable and having two brackets defining said cooperative members, each mounted on the inner side of said lens protector member with respect to said camera and movable into releasable abutment with each of said pins.

4. The mechanism as claimed in claim 2, in which said focussing member comprises a rotatable cylindrical member mounted concentric with said lens barrel, said cylindrical member having one pin as said abutment member located at a peripheral portion on a front surface thereof to axially project outwards with respect to said camera, and said lens protector member is a lid provided in front of said cylindrical member with respect to said camera and is transversely movable relative to said lens barrel; said lid having a plate member as said cooperative member which is fixed on the inner side thereof and formed with a V-shaped notch the tip end of said pin being movable into abutment with the base of said notch.

5. The mechanism as claimed in claim, 1 in which said focussing member comprises a cylindrical member mounted concentric with said lens barrel and means transversely movable relative to said lens barrel into engagement with and to rotate said cylindrical member; said reset means comprising at least one abutment member provided on one of said transversely movable means and said lens protector member, and a cooperative member provided on the other of said members said abutment and cooperative members being in engagement when said lens protector member is at said closed position and when said cylindrical member is at said reset focus position.

6. The mechanism as claimed in claim 5, wherein said cylindrical member includes a toothed periphery and in which said transversely movable means comprises a toothed rack having a vertically projecting pin located thereon defining said abutment member and meshingly engaging the toothed periphery of said cylindrical member; said lens protector member is a transversely movable lid provided in front of said cylindrical member and having two brackets mounted on the inner side thereof in transverse registry with said pin.

7. The mechanism as claimed in claim 6, including a lever pivotally mounted between its ends and in which one of said brackets movable abuts said pin at one side thereof, while the other bracket movable abuts one end of said lever pivoted at the center thereof, the other end of said lever movably abutting said pin at the other side thereof.

8. The mechanism as claimed in claim 6, in which said transversely movable means further comprises a second toothed rack having a vertically projecting pin located thereon said first and second toothed racks being parallel to each other and engaging said peripherally toothed cylinder arranged therebetween, said brackets respectively being in registry with each of said pins.

9. The mechanism as claimed in claim 5, wherein said cylindrical member includes a toothed periphery and in which said transversely movable means comprises two toothed racks parallel to each other and engaging said peripherally toothed cylindrical member arranged therebetween, each of said racks having a vertically projecting pin located thereon; said lens protector member is a lid transversely movable in front of said cylindrical member and has two verticaly projecting pins, said mechanism includes two levers, each respectively pivoted at its center thereof for independent angular movement, each of said levers being swingable into abutment with the corresponding pair of pins located on said rack and said lid.

10. The mechanism as claimed in claim 5, wherein said cylindrical member includes a toothed periphery and in which said transversely movable means comprises two toothed racks parallel to each other and engaging said peripherally toothed cylindrical member arranged therebetween, each of said racks having a vertically projecting pin located thereon; said lens protector means is a lid hingedly provided in front of said cylindrical member for angular movement and has two levers angularly movable in response to the angular movement of said lid so that each free end of said two levers are movable into abutment with each of said pins.

11. The mechanism as claimed in claim 5, including two pulleys and in which said transversely movable means is an endless cable extending between said two pulleys and engaging said cylindrical member, rotation of either of said pulleys angularly moving said cylindrical member, said cable having two stop members fixed at the upper and lower runs thereof; said lens protector means is a transversely movable lid provided in front of said cylindrical member and having two brackets mounted on the inner side thereof engagable with each of said stop members.

* * * * *

UNITED STATES PATENT AND TRADEMARK OFFICE
CERTIFICATE OF CORRECTION

PATENT NO. : 3,798,670
DATED : March 19, 1974
INVENTOR(S) : Harumi Tanaka

It is certified that error appears in the above-identified patent and that said Letters Patent are hereby corrected as shown below:

Claim 1, line 5, change "removable" to --movable--.

Signed and Sealed this

Twenty-fifth Day of August 1981

[SEAL]

Attest:

Attesting Officer

GERALD J. MOSSINGHOFF
Commissioner of Patents and Trademarks